Patented June 30, 1936

2,045,574

UNITED STATES PATENT OFFICE 2,045,574

PROCESS FOR THE CATALYTIC SYNTHESIS OF AMINES

Homer Adkins, Madison, Wis., and Charles F. Winans, Akron, Ohio

No Drawing. Application June 28, 1932, Serial No. 619,732

24 Claims. (Cl. 260—128)

This invention relates to a new and improved process for the catalytic synthesis of amines. More particularly it relates to a process for the catalytic synthesis of amines by the hydrogenation, under pressure and in the presence of a contact catalyst, of reaction products of carbonyl compounds and ammonia or amines. The invention is particularly applicable to the preparation of amines which have heretofore been capable of preparation by hydrogenation methods only with difficulty.

It is known that primary amines may be obtained by conducting a mixture of vaporized carbonyl compounds, hydrogen and ammonia over catalysts at atmospheric pressure and rather high temperatures. The preparation of these compounds at atmospheric pressure is undesirable inasmuch as the process, among other things, is applicable only to a limited number of the more easily hydrogenated materials. Moreover, at atmospheric pressure higher temperatures are required, thereby producing undesirable side reactions, such as the aldolization of aldehydes in case an aldehyde is employed, resulting in the formation of amines of high molecular weight. The necessity for vaporizing the carbonyl compounds of the prior art processes is also undesirable because of the required increase in steps in the process.

According to the present invention, primary, secondary and tertiary amines may be prepared by hydrogenating under pressure, in the liquid phase and in the presence of a contact catalyst, a reaction product of ammonia or an amine and a carbonyl compound. By this discovery, amines of high purity may be prepared quickly, efficiently and in excellent yields. In this application, the term "carbonyl compounds" is used to represent aldehydes and ketones, either aliphatic or cyclic. Of the amine starting materials, any primary or secondary compound containing the group =NH, aliphatic or cyclic, may be used. The pressures found preferable will in general range from 50 to 150 atmospheres; the temperatures, from 50 to 200 degrees C.

The carbonyl compound and the amine may be mixed just prior to hydrogenation or they may be first isolated as a distinct reaction product, the product resulting therefrom then being hydrogenated. In all cases the invention may be practiced by merely associating the amine with the carbonyl compound and then hydrogenating the mixture. In those cases in which the reaction products are unstable, it is desirable to hydrogenate the mixture directly. It is of course to be understood that either process may be used in the practice of the invention.

Although any of the ordinary hydrogenation catalysts are applicable to this invention, it has been found that a nickel catalyst prepared according to the process outlined more fully in the patent application of Homer Adkins, Serial No. 616,093, filed June 8, 1932, gives excellent results. This nickel catalyst is prepared by mixing an aqueous solution of a nickel salt and a foraminous carrier, preferably acid washed kieselguhr, and thereafter grinding the carrier-nickel salt mixture until it is of a cream-like consistency. Following this, a basic carbonate precipitant, preferably sodium bicarbonate in water solution, is added to the ground mixture of carrier and soluble nickel compound. After washing and drying, the resulting precipitated nickel carbonate is reduced in a stream of hydrogen or other reducing gas for approximately sixty to eighty minutes at 425-475 degrees C., the finshed catalyst containing 14-15% nickel. Other catalysts may of course be used with excellent results, examples being those of copper and cobalt prepared in a similar manner.

Likewise other nickel catalysts prepared by methods such as the following may be used: (1) the reduction of any nickel salt, either supported or unsupported, by hydrogen or other reducing agents; (2) the treatment of a nickel-alloy such as Ni—Al or Ni—Si, with aqueous alkalis; (3) the reduction of nickel salts in admixture with salts of other metals of groups VIII or I of Mendelejeff's Periodic Table acting as co-catalysts; (4) the reduction of nickel salts mixed with promoters such as oxides of the metals of groups II, III, IV, V and VI of the Periodic Table; (5) mechanical subdivision of massive nickel; (6) anodic oxidation of nickel surfaces followed by reduction; (7) colloidal dispersion of metallic nickel; and (8) precipitation by more electropositive metals, such as aluminum and zinc.

In this invention the process may be represented by the following general equations:

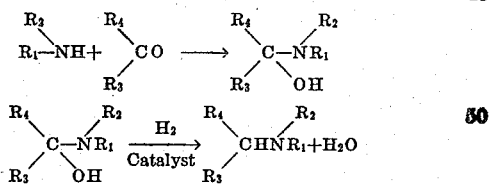

$R_1$, $R_2$, $R_3$ and $R_4$ may be hydrogen or any alkyl, alicyclic, aryl, aralkyl or heterocyclic group.

When an aldehyde and a primary amine are used, the reactions may be written in three steps as shown by the following:

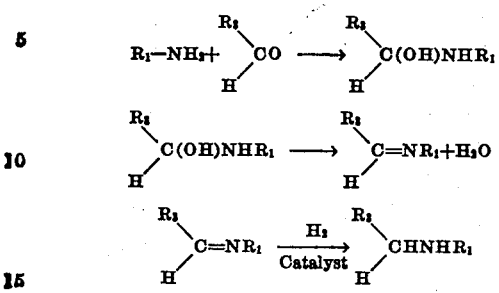

and with a secondary amine and an aldehyde as follows:

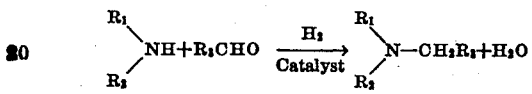

As illustrative of the invention, but not limitative thereof, the following examples are given.

Example 1

A mixture of .4 mol cyclohexylamine and .4 mol cyclohexanone was completely hydrogenated in the presence of approximately 4 grams of a nickel catalyst prepared according to the process outlined in application Serial No. 616,093, filed June 8, 1932, under a pressure of about 100 atmospheres at a temperature of approximately 125 degrees C. in two hours. The product upon fractional distillation gave approximately a 70% yield of dicyclo hexylamine, boiling point 115-120 degrees C. at 10 mm. pressure, along with a small quantity of cyclohexanol.

Example 2

Further illustrative of the improved process in this invention is the preparation of N-n-butyl cyclohexylamine by the reduction of a mixture of .5 mol cyclohexylamine and .55 mol n-butyr aldehyde in the presence of about 4 grams of a nickel catalyst similar to that used in Example 1. After one hour's hydrogenation at about 125 degrees C. and a pressure of 70-110 atmospheres, the reaction was complete. Upon fractional distillation of the product, a 91% yield of N-n-butyl cyclohexylamine, boiling point 200-204 degrees C., was obtained.

Example 3

N-n-butyl piperidine, boiling point 170-174 degrees C., was obtained upon fractional distillation of the product obtained from the hydrogenation of a mixture of .45 mol of piperidine and .5 mol n-butyr aldehyde at about 125 degrees C. and 70-110 atmospheres' pressure in the presence of approximately 4 grams of the nickel catalyst used in Examples 1 and 2. In two hours the materials were completely hydrogenated, producing a 93% yield of N-n-butyl piperidine.

Example 4

A mixture of .41 mol beta phenethyl amine and .42 mol n-butyraldehyde was reduced at 125 degrees C. under a pressure ranging from 50 to 150 atmospheres for one hour with 4 grams of a nickel catalyst. Two products, N-n-butyl beta phenethyl amine, boiling point 130-135 degrees C. at 10 mm. pressure, and N-di-n-butyl beta phenethyl amine, boiling point 162-168 degrees C. at 10 mm. pressure, were obtained in yields of approximately 36% and 11% respectively.

Example 5

Illustrative of the hydrogenation of isolated reaction products of carbonyl compounds and amines is the reduction of hydrobenzamide.

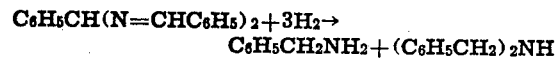

In this process 50 grams (0.167 mol) of hydro benzamide, melting point 101 degrees C., in ethanol solution was reduced over 4 grams of the nickel catalyst used in Example 1 for 40 minutes at 100 degrees C. under a pressure of 75-125 atmospheres. The product upon fractional distillation gave a 94% yield of benzylamine and a 90% yield of dibenzyl amine, boiling point, 120-123 degrees C. at 1 mm. pressure, expressed as percentages of the theoretical quantities of benzylamine and dibenzylamine obtainable.

Example 6

Approximately 115 grams of hydro furamid, melting point 120-121 degrees C., dissolved in 200 ml. ethanol were hydrogenated over 11 grams of a nickel catalyst for 2 hours at a temperature of about 100 degrees C. and under a pressure of 70-110 atmospheres. The product on fractional distillation gave a 92% yield of tetra hydro alpha furfuryl amine, boiling point 50-52 degrees C. at 735 mm. pressure, and a 92% yield of dialpha furfuryl amine, boiling point 103-106 degrees C. at 2-3 mm. The equation representing the reaction is as follows:

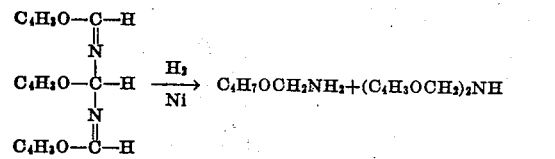

Similarly, benzal aniline in ethanol solution upon hydrogenation at 70 degrees C. at about 100 atmospheres pressure and in the presence of 4 grams of a nickel catalyst gave a 96½% yield of benzyl aniline, boiling point 144-146 degrees C. at 1 mm. Also, alpha beta cinnamaldoxime in ethyl ether solution at 100 degrees C. and 100 atmospheres gave about a 42% yield of gamma phenyl propyl amine, boiling point 75-80 degrees C. at 1 mm., when reduced over 4 grams of a nickel catalyst. Exemplary of other isolated carbonylamine reaction products which may be hydrogenated are benzaldoxime, cyclohexyl butyr aldimine and tri-acetone amine.

Exemplary of aldehydes which may be used in the practice of the invention are furfural, formaldehyde, crotonaldehyde, acetaldehyde, propionaldehyde, isovaleraldehyde, isocapronic aldehyde, cinnamic aldehyde, benzaldehyde, citral and acrolein. Illustrative of the ketones are acetone, ethyl methyl ketone, diethyl ketone, dipropyl ketone, ethyl propyl ketone, cyclohexanone, phenyl ethyl ketone, benzal acetone, aceto phenone, benzo phenone, phorone and mesityl oxide. Any compound containing the group =NH, aliphatic or cyclic, may be used, examples being piperidine, ethyl amine, aniline, allyl amine, ammonia, furfuryl amine, para phenetidine, benzyl amine, toluidine, beta naphthylamine, tetra hydro furfuryl amine, alpha naphthylamine, cyclohexylamine, dicyclohexylamine, tetra hydro naphthylamines, methyl aniline, xylidine, benzidine, tolidine, diethyl amine, amino pyridine, dimethyl amine, butyl amine and vinyl amine.

It is readily seen that by this invention a very efficient method of preparing amines by hydrogenation is provided. The reaction may be carried out in the liquid phase under pressure, thereby permitting the use of more compact, efficient and simplified apparatus. It also permits greater ease and accuracy in the manipulation of the ingredients and the final products. By the use of pressure the reactions are driven to completion quickly and efficiently, the necessity for vaporizing the ingredients is overcome and syntheses not heretofore capable of being accomplished are made possible. Further, the reaction can be carried out at lower temperatures, thus eliminating undesirable side reactions, and the use of a solvent is made optional.

It is to be understood that the word "amine" used herein and in the appended claims as one of the starting materials includes ammonia and all other compounds containing the group =NH. It is also to be understood that the term "carbonyl compound" has reference to the aldehydes and ketones. Further, by hydrogenating the reaction product is meant hydrogenating either the isolated reaction product or the mixture of the two ingredients.

The various examples hereinbefore set forth are to be understood as illustrative only and not limitative of the scope of the invention. Other hydrogenation catalysts than those indicated in the various examples may be employed in the manufacture of the various amines. It is intended that the patent shall cover, by suitable expression in the appended claims, whatever features of patentable novelty reside in the invention.

What is claimed is:

1. A process for preparing secondary amines which comprises hydrogenating in the liquid phase a reaction product of a primary amine and a carbonyl compound selected from the class consisting of aldehydes and ketones at superatmospheric temperatures, under a pressure of from 50 to 150 atmospheres and in the presence of a reduced nickel catalyst prepared by levigating kieselguhr carrying nickel nitrate, adding to the levigate an alkali metal bicarbonate and reducing the precipitated nickel carbonate.

2. A process for preparing secondary amines which comprises hydrogenating in the liquid phase a reaction product of a primary amine and a ketone at a temperature ranging from approximately 50 to approximately 200° C., under a pressure of from 50 to 150 atmospheres and in the presence of a reduced nickel catalyst prepared by levigating kieselguhr carrying nickel nitrate, adding to the levigate an alkali metal bicarbonate and reducing the precipitated nickel carbonate.

3. A process for preparing secondary amines which comprises hydrogenating in the liquid phase a reaction product of a primary amine and an aldehyde at a temperature ranging from approximately 50 to approximately 200° C., under a pressure of from 50 to 150 atmospheres and in the presence of a reduced nickel catalyst prepared by levigating kieselguhr carrying nickel nitrate, adding to the levigate an alkali metal bicarbonate and reducing the precipitating nickel carbonate.

4. A process for preparing secondary amines which comprises hydrogenating a reaction product of a primary amine and a carbonyl compound selected from the class consisting of aldehydes and ketones under superatmospheric conditions of temperature and pressure, in the liquid phase, and in the presence of a reduced nickel catalyst prepared by levigating kieselguhr carrying nickel nitrate, adding to the levigate a soluble basic carbonate and reducing the resulting precipitated nickel carbonate.

5. A process for preparing N-butyl cyclohexylamine which comprises hydrogenating under superatmospheric conditions of temperature and pressure and in the liquid phase a reaction product of cyclohexyl amine and ni-butyraldehyde in the presence of a metal contact hydrogenation catalyst having an atomic weight between 57 and 64.

6. A process for preparing N-butyl cyclohexylamine which comprises hydrogenating under superatmospheric conditions of temperature and pressure and in the liquid phase a reaction product of cyclohexylamine and n-butyraldehyde in the presence of a nickel catalyst.

7. A process for preparing N-n-butyl beta phenethyl amine which comprises hydrogenating under superatmospheric conditions of temperature and pressure and in the liquid phase a reaction product of beta phenethyl amine and n-butyraldehyde in the presence of a metal hydrogenation catalyst having an atomic weight between 57 and 64.

8. A process for preparing N-n-butyl beta phenethyl amine which comprises hydrogenating under superatmospheric conditions of temperature and pressure and in the liquid phase a reaction product of beta phenethyl amine and n-butyraldehyde in the presence of a nickel catalyst.

9. A process for preparing secondary and tertiary amines which comprises hydrogenating under superatmospheric conditions of temperature and pressure, in the liquid phase and in the presence of a metal hydrogenation catalyst having an atomic weight between 57 and 64, a reaction product of a carbonyl compound selected from the class consisting of aldehydes and ketones and an amine containing the group

wherein at least one of the R groups is hydrocarbon.

10. A process for preparing secondary and tertiary amines which comprises hydrogenating under superatmospheric conditions of temperature and pressure, in the liquid phase and in the presence of a metal hydrogenation catalyst having an atomic weight between 57 and 64, a reaction product of a ketone and an amine containing the group

wherein at least one of the R groups is hydrocarbon.

11. A process for preparing secondary and tertiary amines which comprises hydrogenating under superatmospheric conditions of temperature and pressure, in the liquid phase and in the presence of a metal hydrogenation catalyst having an atomic weight between 57 and 64, a reaction product of an aldehyde and an amine containing the group

wherein at least one of the R groups is hydrocarbon.

12. A process of preparing secondary and tertiary amines which comprises hydrogenating in the liquid phase, at a temperature ranging from approximately 50 to approximately 200° C., under a pressure ranging from 50 to 150 atmospheres and in the presence of a nickel catalyst, a reaction product of a saturated carbonyl compound selected from the class consisting of aldehydes and ketones and an aliphatic amine.

13. A process of preparing secondary and tertiary amines which comprises hydrogenating in the liquid phase, at a temperature ranging from approximately 50 to approximately 200° C., under a pressure ranging from 50 to 150 atmospheres and in the presence of a nickel catalyst, a reaction product of a carbonyl compound selected from the class consisting of aldehydes and ketones and an aliphatic amine.

14. A process of preparing secondary and tertiary amines which comprises hydrogenating under superatmospheric conditions of temperature and pressure, in the liquid phase and in the presence of a nickel hydrogenation catalyst, a reaction product of a saturated aldehyde and a hydrocarbon substituted amine containing at least one hydrogen atom attached to the amino nitrogen atom.

15. A process of preparing secondary and tertiary amines which comprises hydrogenating under superatmospheric conditions of temperature and pressure, in the liquid phase and in the presence of a reduced nickel catalyst supported on kieselguhr, a reaction product of a saturated aldehyde and a hydrocarbon substituted amine containing at least one hydrogen atom attached to the amino nitrogen atom.

16. A process of preparing secondary and tertiary amines which comprises hydrogenating under superatmospheric conditions of temperature and pressure, in the liquid phase and in the presence of a metal hydrogenation catalyst having an atomic weight between 57 and 64, a reaction product of a saturated aldehyde and an amine containing at least one hydrogen atom attached to the amino nitrogen atom.

17. A process for preparing dicyclohexylamine which comprises hydrogenating in the liquid phase, at a temperature ranging from approximately 50 to approximately 200° C., under a pressure ranging from 50 to 150 atmospheres and in the presence of a nickel hydrogenation catalyst, a reaction product of cyclohexylamine and cyclohexanone.

18. A process of preparing dicyclohexylamine which comprises hydrogenating under superatmospheric conditions of temperature and pressure, in the liquid phase and in the presence of a metal hydrogenation catalyst having an atomic weight between 57 and 64, a reaction product of cyclohexylamine and cyclohexanone.

19. A process for preparing secondary amines which comprises hydrogenating under superatmospheric conditions of temperature and pressure, in the liquid phase and in the presence of a metal hydrogenation catalyst having an atomic weight between 57 and 64, a mixture or preformed reaction product of a primary amine and a carbonyl compound selected from the group consisting of aldehydes and ketones.

20. A process for preparing secondary amines which comprises hydrogenating under superatmospheric conditions of temperature and pressure, in the liquid phase and in the presence of a metal hydrogenation catalyst having an atomic weight between 57 and 64, a mixture or preformed reaction product of an amine containing at least one hydrogen atom attached to the amino nitrogen atom and a carbonyl compound selected from the group consisting of aldehydes and ketones.

21. A process for preparing secondary amines which comprises hydrogenating under superatmospheric conditions of temperature and pressure, in the liquid phase and in the presence of a metallic nickel catalyst, a mixture or preformed reaction product of a saturated primary amine and an aldehyde.

22. A process for preparing secondary amines which comprises hydrogenating under superatmospheric conditions of temperature and pressure, in the liquid phase and in the presence of a metallic nickel catalyst, a mixture or preformed reaction product of a primary amine and a ketone.

23. A process for preparing secondary amines which comprises hydrogenating under superatmospheric conditions of temperature and pressure, in the liquid phase and in the presence of a metallic nickel catalyst, a mixture or preformed reaction product of a primary amine and a carbonyl compound selected from the group consisting of aldehydes and ketones.

24. A process of preparing secondary and tertiary amines which comprises hydrogenating under superatmospheric conditions of temperature and pressure, in the liquid phase and in the presence of a metal hydrogenation catalyst having an atomic weight between 57 and 64, a reaction product of an aldehyde and a saturated amine containing at least one hydrogen atom attached to the amino nitrogen atom.

HOMER ADKINS.
CHARLES F. WINANS.